(12) United States Patent
Oliver et al.

(10) Patent No.: US 10,764,532 B2
(45) Date of Patent: Sep. 1, 2020

(54) METHOD AND SYSTEM FOR LOCATING INGRESS UTILIZING CUSTOMER PREMISES EQUIPMENT

(71) Applicant: JDS Uniphase Corporation, Milpitas, CA (US)

(72) Inventors: Kevin J. Oliver, Fishers, IN (US); Koji Okamoto, Indianapolis, IN (US); Gregory W. Massey, Greenfield, IN (US); Walter Miller, Greenwood, IN (US)

(73) Assignee: VIAVI SOLUTIONS INC., Milpitas, CA (US)

(*) Notice: Subject to any disclaimer, the term of this patent is extended or adjusted under 35 U.S.C. 154(b) by 694 days.

(21) Appl. No.: 14/067,596

(22) Filed: Oct. 30, 2013

(65) Prior Publication Data

US 2014/0123203 A1     May 1, 2014

Related U.S. Application Data

(60) Provisional application No. 61/720,210, filed on Oct. 30, 2012.

(51) Int. Cl.
| | |
|---|---|
| *H04N 21/235* | (2011.01) |
| *H04N 21/64* | (2011.01) |
| *H04N 7/10* | (2006.01) |
| *H04N 21/61* | (2011.01) |
| *H04L 12/26* | (2006.01) |
| *H04N 21/647* | (2011.01) |

(52) U.S. Cl.
CPC ............ *H04N 7/102* (2013.01); *H04L 43/10* (2013.01); *H04N 21/6118* (2013.01); *H04N 21/6168* (2013.01); *H04N 21/64723* (2013.01); *H04N 21/64753* (2013.01)

(58) Field of Classification Search
CPC .................................................. H04N 21/235
USPC ......................................................... 725/107
See application file for complete search history.

(56) References Cited

U.S. PATENT DOCUMENTS

| | | | |
|---|---|---|---|
| 4,520,508 A | 5/1985 | Reichert, Jr. ................. 725/125 |
| 5,943,604 A * | 8/1999 | Chen et al. .................. 455/3.06 |
| 6,839,829 B1* | 1/2005 | Daruwalla .......... H04L 12/2801 |
| | | | 348/E7.07 |
| 7,317,754 B1* | 1/2008 | Remy ................... H04L 1/0002 |
| | | | 375/222 |
| 7,489,641 B2 | 2/2009 | Miller et al. ............... 370/241.1 |
| 8,578,437 B2* | 11/2013 | Nielsen et al. ............... 725/125 |
| 8,978,081 B2* | 3/2015 | McClay .............. H04N 17/004 |
| | | | 725/107 |
| 9,015,786 B2* | 4/2015 | Wolcott ................ H04B 15/00 |
| | | | 725/125 |
| 2002/0088003 A1* | 7/2002 | Salee ........................... 725/111 |

(Continued)

*Primary Examiner* — Mushfikh I Alam
(74) *Attorney, Agent, or Firm* — Mannava & Kang, P.C.

(57) ABSTRACT

Unlike conventional methods and systems for locating ingress, which only monitor the upstream path, a method and system of locating ingress by monitoring the downstream path is provided. A test system measures the signal quality in the upstream path and in dependence upon a noise level being above a predetermined limit, polls a plurality of terminal equipment devices to return a downstream signal quality measurement. The test instrument analyzes the downstream signal quality measurements to locate an ingress source contributing to the noise.

20 Claims, 4 Drawing Sheets

(56) References Cited

U.S. PATENT DOCUMENTS

| | | | |
|---|---|---|---|
| 2002/0095686 A1* | 7/2002 | Shi et al. | 725/107 |
| 2002/0197053 A1* | 12/2002 | Nakamura | G06F 17/30787 386/249 |
| 2002/0199202 A1* | 12/2002 | Hunter | 725/105 |
| 2004/0151108 A1* | 8/2004 | Blasco Claret | H04L 1/0003 370/206 |
| 2005/0028219 A1* | 2/2005 | Atzmon | H04N 21/654 725/116 |
| 2005/0047442 A1 | 3/2005 | Volpe et al. | 370/480 |
| 2005/0114879 A1* | 5/2005 | Kamieniecki | 725/15 |
| 2005/0183130 A1* | 8/2005 | Sadja et al. | 725/107 |
| 2006/0031905 A1* | 2/2006 | Kwon | H04H 20/12 725/108 |
| 2006/0225109 A1* | 10/2006 | Seo | 725/100 |
| 2006/0256898 A1 | 11/2006 | Popper et al. | 375/346 |
| 2006/0288098 A1* | 12/2006 | Singh | H04L 41/06 709/224 |
| 2007/0033618 A1* | 2/2007 | Kiukkonen | G01S 19/21 725/62 |
| 2007/0176807 A1* | 8/2007 | Mattes | G01R 31/31716 341/118 |
| 2008/0064349 A1 | 3/2008 | Flask et al. | 455/161.2 |
| 2008/0168518 A1* | 7/2008 | Hsue et al. | 725/125 |
| 2008/0320541 A1 | 12/2008 | Zinevich | 725/127 |
| 2009/0007210 A1* | 1/2009 | Nishide et al. | 725/125 |
| 2009/0064248 A1* | 3/2009 | Kwan | H04L 12/1868 725/109 |
| 2009/0132650 A1* | 5/2009 | Tazzari | H04L 7/048 709/204 |
| 2010/0100919 A1* | 4/2010 | Hsue et al. | 725/111 |
| 2010/0195745 A1* | 8/2010 | Gupta | H04B 3/46 375/257 |
| 2010/0319021 A1* | 12/2010 | Emerson | G08B 25/08 725/33 |
| 2011/0234313 A1* | 9/2011 | Spies | H03G 3/3036 330/127 |
| 2011/0258677 A1* | 10/2011 | Shafer | H04B 3/36 725/116 |
| 2012/0213259 A1 | 8/2012 | Renken et al. | 375/222 |
| 2012/0327988 A1 | 12/2012 | Maxson et al. | 375/222 |
| 2013/0003565 A1 | 1/2013 | Gotwals et al. | 370/252 |
| 2013/0051314 A1* | 2/2013 | Ong | H04W 88/06 370/328 |
| 2013/0142287 A1* | 6/2013 | Kravets | H04W 52/0245 375/340 |
| 2013/0291029 A1* | 10/2013 | Wells | H04N 21/6168 725/78 |
| 2014/0082686 A1* | 3/2014 | Maxson | H04H 20/12 725/125 |
| 2014/0123203 A1* | 5/2014 | Oliver | H04L 43/10 725/125 |
| 2014/0223504 A1* | 8/2014 | Ling | H04N 21/6168 725/116 |
| 2016/0066057 A1* | 3/2016 | Kao | H04N 21/440263 725/127 |
| 2016/0112734 A1* | 4/2016 | Williams | H04H 20/12 725/118 |

* cited by examiner

METHOD AND SYSTEM FOR LOCATING INGRESS UTILIZING CUSTOMER PREMISES EQUIPMENT

CROSS-REFERENCE TO RELATED APPLICATIONS

The present invention claims priority from U.S. Provisional Patent Application No. 61/720,210 filed Oct. 30, 2012, the entirety of which is incorporated herein by reference.

TECHNICAL FIELD

The present invention relates generally to a method and system for locating ingress, and in particular to a method and system for locating ingress noise in a cable network utilizing customer premises equipment.

BACKGROUND OF THE INVENTION

Traditionally, cable networks were based on coaxial cable that was laid up to and installed inside various subscriber premises. However, with the growth of the Internet and desire to provide high-speed Internet access and/or on-demand programming, it is now common for sections of the coaxial cable to be upgraded to lower loss fiber. Accordingly, these cable networks are often referred to as Hybrid Fiber Coaxial (HFC) networks. In a typical HFC network, data carried by optical signals is transmitted over long distances of optical fibers, and then transformed to radiofrequency (RF) signals and transmitted over CATV cable. For example, in many HFC networks optical signals from the master headend are transmitted on trunklines that go to several distribution hubs, from which multiple optical fibers fan out to carry the optical signal to boxes called optical nodes in local communities. At the nodes, the optical signals are transformed to RF signals and carried by various local coax cables to different subscriber premises.

Data Over Cable Service Interface Specification (DOCSIS) is the international telecommunications standard developed by CableLabs, which allows transparent, bi-directional, high-speed data transfer over an existing cable TV (CATV) system. A DOCSIS system typically includes a cable modem (CM) located at one or more subscriber premises and a cable modem termination system (CMTS) located at a headend or hub. For example, one or more CMTSs, which access a backbone network (such as the Internet), are often located in a headend system that is generally stored within a central office of a cable service provider, while a plurality of CMs are located at different subscriber premises. The transparent, bi-directional, transfer of Internet Protocol (IP) traffic between the CMTSs and the CMs is achieved via the cable network. The communication direction from the CMTS to the CMs is referred to as the downstream direction, whereas the communication direction from the CMs to the CMTS is referred to as the upstream direction.

Referring to FIG. 1, there is shown a schematic diagram of one embodiment of a HFC network. The HFC network 10 includes a headend 2 coupled to a node 8 via fiber optic cable 3 and coaxial cable 7. The fiber optic cable 3 and coaxial cable 7 convey information (e.g., television programming, Internet data, voice services, etc.) between the headend 2 and the plurality of subscriber premises 28a, 28b, 28c served by the distribution node 8. In general, the headend 2 will either be a large central headend or a smaller headend (e.g., a distribution hub). Note that only one node 8 and three subscriber premises 28a/28b/28c of the HFC network are illustrated for exemplary purposes. In general, the HFC network 10 will include more than one node and more than three subscriber premises. For example, each hub in a typical HFC network will serve over one hundred nodes, while each node provides up to 200 homes with DOCSIS service. A city the size of Indianapolis may have five or six hub sites.

The CMTS 4, which includes a network interface (e.g., an Ethernet interface) to servers 23 via the network 1, provides downstream control and data delivery via the downstream signal combiner 24 and upstream control and data reception via the upstream signal splitter 25. The signal combiner 24 couples the downstream signal of the CMTS 4 with the other signals (e.g. TV, Test, Telephony etc.). The output of the signal combiner 24 is connected to a fiber transceiver node 26, which converts the combined downstream signal suite from RF signals to optical signals, and delivers the combined optical signal suite to a remote location via the fiber optic link 3. The downstream optical signals are converted to RF signals at the transceiver node 27, which is also optically coupled to the optical fiber link 3. The RF signals from the transceiver node 27 are delivered to different subscriber premises 28a, 28b, 28c via the distribution node 8.

The distribution node 8 is part of the CATV plant 21. The CATV plant 21 also includes coaxial cable 7 connected to the plurality of subscriber premises 28a, 28b, 28c. As is known in the art, each of the subscriber premises 28a, 28b, 28c may be a residence, a commercial establishment, or an industrial establishment. Each subscriber premises 28a, 28b, 28c includes customer premises equipment (CPE) 5, which is any type of electronic equipment located on the customers premises and connected to the network. For example, in one embodiment CPE 5 includes one or more cable modems (CMs), telephones, routers, switches, residential gateways, set-top boxes, fixed mobile convergence products, etc. Referring to FIG. 2, there is shown an embodiment wherein the CPE 5 includes a VoIP analog terminal adaptor 6a for a telephone 4a, a CM 6b for a computer 4b, and a set-top box 6c for a television 4c. Data and control signals are transmitted from the CMTS 4 on downstream channels and are detected and demodulated by each of the CPE components 6a, 6b, 6c. The CPE components 6a, 6b, 6c also transmit upstream signals, including VoIP conversations, internet uploads, on-demand requests, etc. to the CMTS 4. Accordingly, CPE devices are commonly termed terminal equipment devices.

Although the coaxial cables and connectors within the cable plant 21 are typically shielded to prevent over-the-air signals from affecting the signals carried within the coaxial cable, electromagnetic fields often leak therethrough. Egress, which is defined as the passage of signal carried within the coaxial cable into the outside world, can result in a weaker signal at the end of the cable and radio frequency interference to nearby devices. Ingress, which is defined as the passage of an outside signal into the coaxial cable, can dramatically reduce the reliability of upstream data transmissions in the cable network.

The noise resulting from ingress, commonly termed "ingress noise", makes up a large percentage of the total noise found in many HFC networks. For example, ingress often occurs where the shielding, connectors, or terminations in the cable plant 21 are substandard or damaged. The source of the outside signal, which is commonly referred to as an "ingress source", is often found on the subscriber's premises. For example, some examples common ingress sources include hair dryers, washing machines, vacuum cleaners, blenders, bread makers, remote control cars, cordless phones, ham radio, machinery, microwave ovens, and/or other devices at or near the same frequency as the RF signals. Unfortunately, since these ingress sources often create intermittent and/or seemingly random signals, ingress noise can be difficult to locate and/or track over time.

In general, the upstream or return path of a HFC network is more susceptible to ingress noise than the downstream path. One reason the upstream path is more susceptible is that it uses lower frequencies (e.g., upstream data is typically allocated to a CATV channel in the 5-42 MHz range, whereas downstream data is typically allocated to a CATV channel in the 50 MHz-1 GHz range), which increases the susceptibility to noise. Another reason the upstream path is more affected by ingress, is that all the subscriber's premises 28a, 28b, 28c utilize the same, relatively narrow upstream frequency range. Accordingly, ingress noise from various sources within the cable plant will combine as the signal propagates towards the headend (e.g., the hierarchical nature of a typical cable plant tends to increasingly concentrate and amplify ingress noise in the upstream path, resulting in a "funnel effect", wherein the combined ingress noise at the headend is relatively high).

Reducing ingress noise and/or locating ingress sources is important to improving signal quality and/or improving the performance of the services that are being offered by the operator. Although operators have been monitoring noise in the upstream frequency band at the headend for years, just knowing that the noise exists does not aid in finding and fixing the ingress source. In fact, as a result of the "funnel effect" created by the combining nature of the CATV plant 21, it is very challenging to find ingress sources (e.g., which could be from any home, strand, or component on a node of the cable network identified as being affected by significant noise that is exceeding operator thresholds).

There have been several strategies employed by operators for finding and/or reducing ingress noise in the CATV plant. Since the upstream path is more susceptible and/or affected by ingress, these approaches typically involve monitoring the upstream communication path, herein referred to as the upstream path.

Perhaps the most common strategy is to begin looking for noise at a node identified as being affected by significant noise and then to traverse the network away from the headend until the source of the noise has been found and fixed. For example, one approach to locating an ingress source is to have a technician equipped with a handheld signal measurement device measure noise levels at each input of a first amplifier (e.g., bridger amplifier), to determine which input exhibits the highest level of noise. The technician then proceeds to a second amplifier, which is downstream from the first amplifier and is connected to the noisiest input of the first amplifier, and repeats the measurement to isolate a noisiest input of the second amplifier. In going from amplifier to amplifier, the technician travels to various locations in the field, repeating the measurements until the ingress source is finally located. Other approaches, which similarly use this type of iterative process commonly referred to as "noise segmentation", involve sequentially disconnecting sections of the plant (e.g., to disconnect power to all amplifiers downstream of a selected amplifier) or using strategically placed low attenuation value switches, while monitoring variations in the noise profile at the headend. Unfortunately, due to the large number of subscriber premises served by each node and due to the fact that ingress noise is often intermittent, these trial and error process are extremely time consuming. For example, consider a weakness in a coax cable within a home that allows ingress into the plant. If this weakness is near a noisy appliance, such as a blender, the only time that noise is present is when the appliance is running. Accordingly, it is very common for a technician to be on a service call for a customer impacting, noise related issue when the noise is not present. Notably, operators have reported that they spend about 95% of their time localization ingress within their plant, and that 95% of the ingress is coming from the subscriber's premises.

Various methods have been proposed in order to reduce the amount of time technicians are in the field. For example, in U.S. Pat. No. 4,520,508 Reichert discloses a dedicated ingress noise monitor disposed at a remote node. The noise monitor measures a noise level at the node and provides information about the measured noise level by amplitude-modulating the return path signal. Unfortunately, since this approach requires the installation of autonomous noise meters, it is comparatively complex and costly.

In U.S. Pat. No. 7,489,641 by Miller et al., a test device disposed remotely from the headend is used to generate test data packets, which have a destination address of the test device itself. Accordingly, when the test data packets are transmitted to the headend, the headend automatically routes them back to the test device. The test packets are then received, demodulated, and analyzed by the test device for faults. Disadvantageously, the test apparatus of Miller et al. cannot distinguish exactly where ingress is occurring.

In U.S. Pat. Appl. Publ. No. 20050047442, Volpe et al. describe a test system that is configured to receive all upstream/downstream channels and demodulate upstream packets. A database of MAC/SID addresses is built, which allows the test system to eventually determine where the packets came from. Once the database is built, the origin of faulty data packets can be determined. Disadvantageously, the test system of Volpe lacks a capability to troubleshoot a particular upstream signal problem in real time.

SUMMARY

Unlike conventional methods and systems for locating ingress, which typically only monitor the upstream path, the methods and systems of the instant disclosure realize and appreciate that noise present in the upstream path, and thus affecting plant performance, likely has an ingress source that also affects the low frequency downstream channels, and that monitoring downstream noise can aid in locating a troublesome ingress source in the upstream path with high efficiency. For example, a faulty connector located on specific customer premises will affect signals propagating to and from a cable modem (CM) on said customer's premises.

In addition, the methods and systems of the instant disclosure realize and appreciate that noise present on the upstream path often originates (e.g., about 95% of the time) somewhere on a subscriber's premises, where customer premises equipment (CPE) also resides, and that the CPE is readily configured to measure downstream noise and to provide feedback to a monitoring system to facilitate locating ingress sources. Since the CPE is used to measure the downstream noise, rather than specialized equipment dedicated only for monitoring noise, these methods and systems provide a relatively simple, inexpensive and widely deployable solution for ingress noise localization, with fewer components.

According one aspect of the present invention there is provided a method of locating ingress in a cable network comprising: measuring signal quality in an upstream path of the cable network using a test system; analyzing the upstream signal quality measurements using the test system to determine if noise in the upstream path is above a predetermined limit; transmitting an instruction signal to a plurality of terminal equipment devices using the test system in dependence upon the noise being above the predetermined limit, the instruction signal including a request for each terminal equipment device in the plurality of terminal equipment devices to transmit a downstream signal quality measurement to the test system, each downstream signal quality measurement obtained by measuring signal quality in the downstream path using the corresponding terminal equipment device; analyzing the downstream signal quality measurements with the test system to locate an ingress source contributing to the noise.

According another aspect of the present invention there is provided a monitoring system for locating ingress in a cable network comprising: a test system for measuring signal quality in an upstream path of the cable network, the test system including a processor for analyzing the upstream signal quality measurements and determining if noise in the upstream path is above a predetermined limit; a plurality of terminal equipment devices coupled to the test system via the cable network, each terminal equipment device in the plurality of terminal equipment devices including a receiver for receiving an instruction signal transmitted from the test system in dependence upon the noise being above the predetermined limit, the instruction signal including a request for the corresponding terminal equipment device to transmit a downstream signal quality measurement to the test system, each downstream signal quality measurement obtained by measuring signal quality in the downstream signal path using the corresponding terminal equipment device; wherein the processor is for analyzing the downstream signal quality measurements and locating an ingress source contributing to the noise in the upstream path.

According another aspect of the present invention there is provided a method of locating ingress in a cable network comprising: monitoring a signal level of a first channel in a downstream path of the cable network with a first terminal equipment device having a first receiver; transmitting feedback from the first terminal equipment device to a test system in communication with the first terminal equipment device via the cable network, the feedback transmitted in dependence upon the downstream signal level being outside of a predetermined range for a predetermined time, the test system including a second receiver for measuring upstream signal quality and a processor for analyzing the feedback and the upstream signal quality measurements; polling a plurality of other terminal equipment devices with the test system, the plurality of other terminal equipment devices selected in dependence upon at least one of the feedback and the upstream signal quality measurements; and analyzing downstream signal quality measurements obtained by the polled plurality of other terminal equipment devices to locate ingress.

BRIEF DESCRIPTION OF THE DRAWINGS

The invention will be described in greater detail with reference to the accompanying drawings, in which.

It will be noted that throughout the appended drawings, like features are identified by like reference numerals.

DETAILED DESCRIPTION

Figure 1:
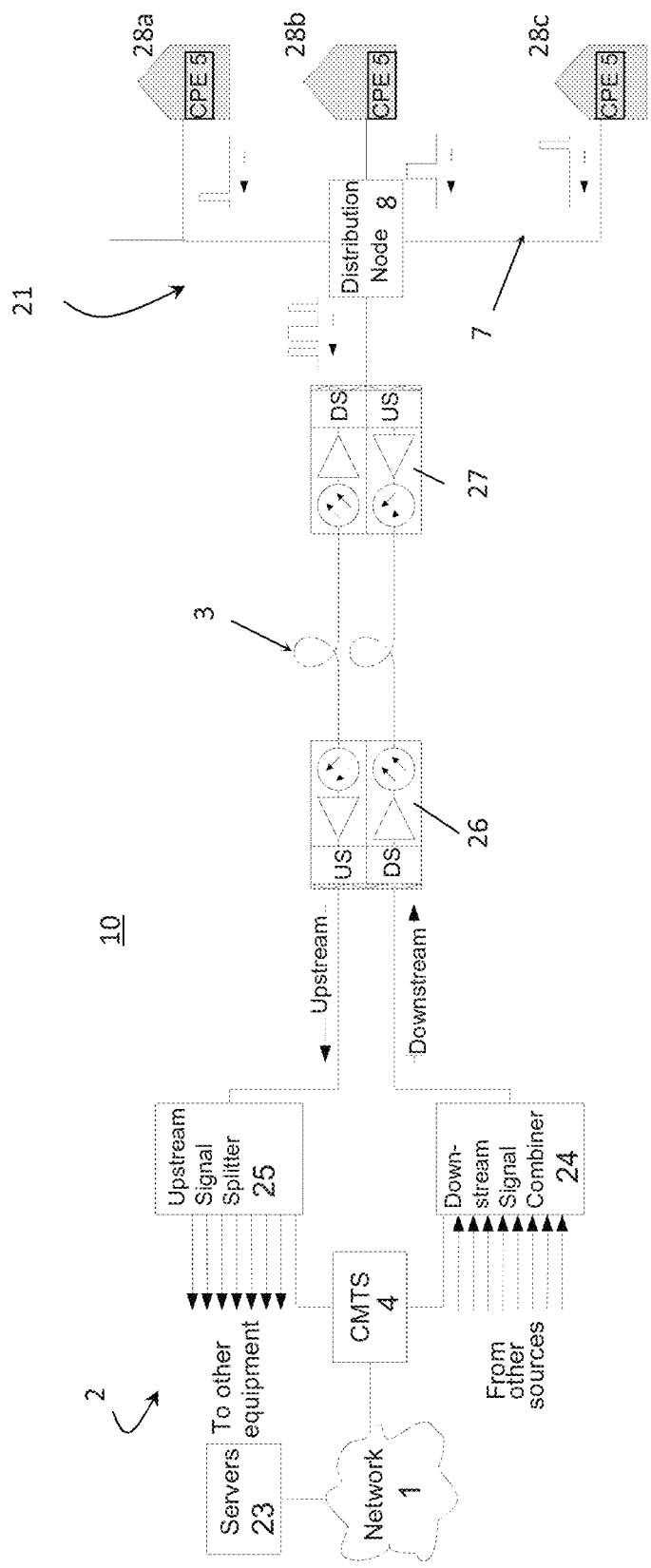
FIG. 1 is a block diagram of a HFC network.
Figure 2:
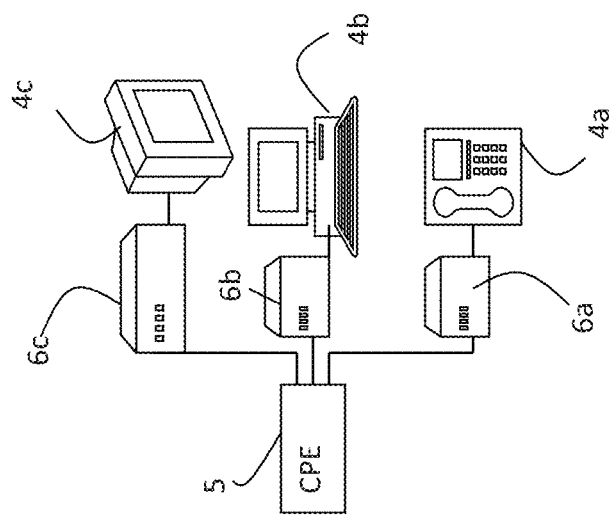
FIG. 2 is a schematic diagram of an embodiment of customer premises equipment in the HFC network illustrated in FIG. 1.

As discussed above, conventional methods and systems for locating ingress noise in the upstream path generally use only results from monitoring ingress noise in the upstream path. In fact, it is widely accepted that noise in the upstream and downstream paths should be addressed and/or monitored separately. For example, noise in the upstream path is often addressed by finding an ingress source and fixing it using the very time-consuming trial and error processes discussed above. In contrast, noise in the downstream path is typically addressed using noise correction. There are many robust mechanisms for noise correction, including methods such as automatic gain control (AGC), forward error correction (FEC), and equalization, each of which is often used to mask the effect of noise on the downstream channels, rather than for finding the source and fixing it. For example, if the noise is constant, one approach to noise correction in the downstream communication path is to use the equalizer in the CPE. Alternatively, if the noise only minimally affects the stability of the signal, the CPE can utilize AGC to correct the signal. In fact, today's CM have impressive ingress noise suppression mechanisms for the downstream signals.

In accordance with one embodiment of the instant invention, CPE at least one subscriber premises is used to obtain downstream parameters, which typically include some type of signal quality measurement, and to send a feedback signal to an upstream test system in dependence upon the downstream parameters.

In general, the CPE will include terminal equipment devices having a receiver for obtaining the downstream parameters (e.g., a CM or set-top box having a quadrature amplitude modulation (QAM) receiver, an analog-to-digital converter (ADC), or digital down-converter (DDC)). In general, terminal equipment devices, such as CMs, will include multiple receivers and transmitters, the number of which typically corresponds to the number of bonded channels. In one embodiment, the downstream parameters are measured directly (e.g., the signal level (e.g., power) of a single downstream channel is measured using a receiver in a CPE). In another embodiment, one of the noise suppression mechanisms integrated into the CPE is used to measure the downstream parameters (e.g., the noise level of a single downstream channel). In most embodiments, the downstream parameters will reflect the downstream carrier stability (e.g., the signal, noise, and/or signal-to-noise (S/N) level over a predetermined time interval). The CPE transmits feedback, determined in dependence upon the downstream parameters, to the upstream test system. In one embodiment, the CPE are provided with software and/or extra circuitry that facilitates the measurement capabilities. The software will typically run alongside the conventional CPE software, either on the same processor, a co-processor, or another processor.

In general, the upstream test system will be a headend noise monitoring system or will monitor the upstream path from a remote location far from the headend 2. For example, in one embodiment the upstream test system is a headend monitoring system connected to the CMTS 4 or to the upstream signal splitter 25. In other embodiments, the upstream test system is disposed away from the headend 2 (e.g., at a node or amplifier), as either part of a dedicated monitoring station or as a portable device. In yet other embodiments, the upstream test system is integrated into the CMTS 4 or another component via software. In general, the upstream test system will allow for upstream signal demodulation and analysis. In one embodiment, the upstream test system includes a signal processor for scanning RF signals for power levels at one or more frequencies, and thus is able to monitor noise in the upstream communication path. In one embodiment, the upstream test system is a PathTrak return path monitoring system offered by JDSU, which monitors and troubleshoots HFC upstream with simultaneous return path monitoring, live remote spectrum views, spectrum and data health reporting, upstream carrier analysis on field meters, node performance history and automated node certification. The upstream test system uses the feedback transmitted from CPE to facilitate location of an ingress source.

Advantageously, using the downstream communication path to detect noise in the upstream communication path obviates the "funnel effect" described above, thus facilitating noise localization. For example, noise that is generated within a home would affect the downstream in that home, but because of the port-to-port isolation of the network components would not affect the downstream noise of other homes.

Further advantageously, utilizing downstream carrier stability to locate ingress into the cable plant, which is either specific to a downstream frequency band or affecting the upstream performance of the system, allows the measurements to be obtained using CPE, thus providing the ideal monitor for continuously monitoring noise within the homes, and providing a direct route for the technician to fix the root cause of noise issues. In addition, since the detection capability is integrated into low cost CPE present at each subscriber premises, such as modems and set-top boxes, significant cost reduction is achieved. For example, fewer components are required and additional noise meters are not required.

Figure 3:
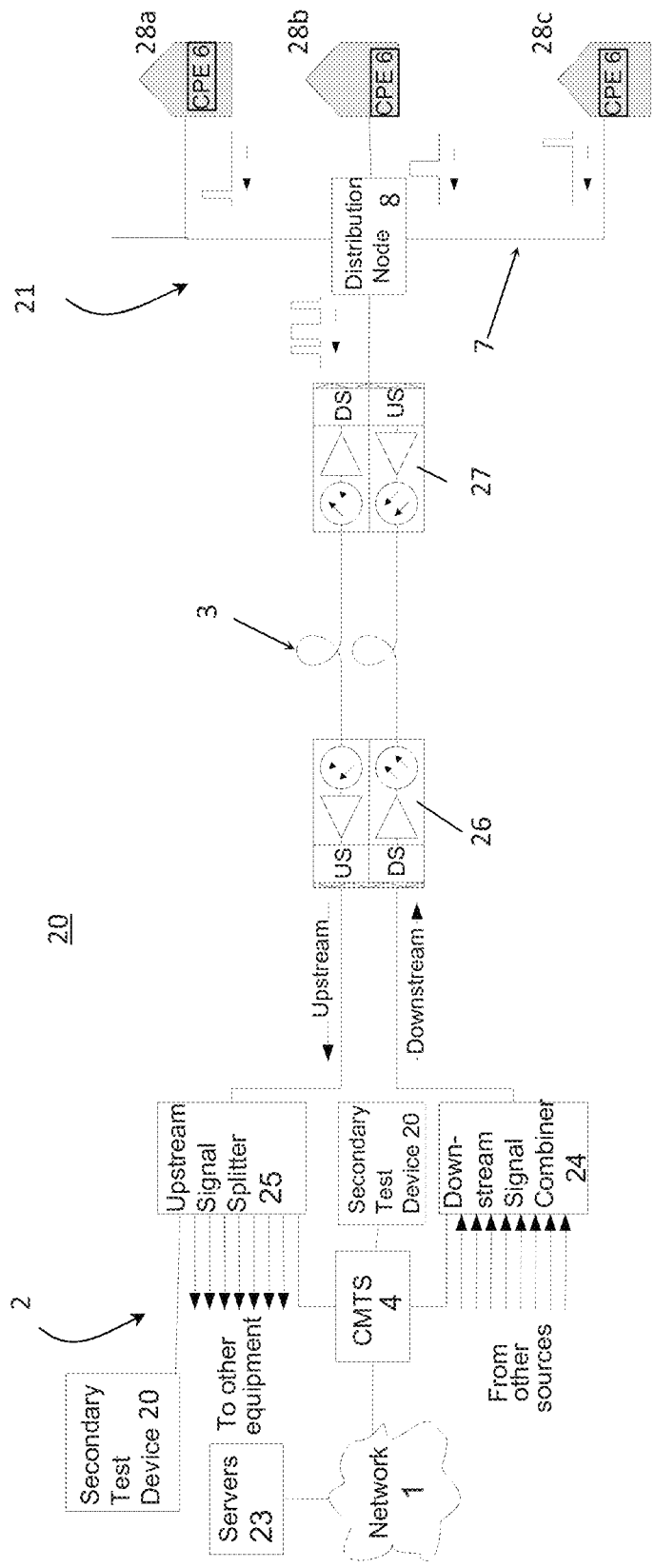
FIG. 3 is a block diagram of a HFC network in accordance with one embodiment of the instant invention.

Referring to FIG. 3, there is shown a block diagram of a HFC system 20 in accordance with one embodiment of the instant invention. The HFC network 20 includes a headend 2 coupled to a node 8 via physical communication media including fiber optic cable 3 and coaxial cable 7. The physical communication media convey information (e.g., television programming, Internet data, voice services) between the headend 2 and the plurality of subscriber premises 28a, 28b, 28c served by the distribution node 8. In general, the headend 2 will either be a large central headend or a smaller headend (e.g., a distribution hub). Note that only one node 8 and three subscriber premises 28a/28b/28c of the HFC network are illustrated for exemplary purposes. In general, the HFC network will include more than one node and more than three subscriber premises.

The CMTS 4, which includes a network interface (e.g., an Ethernet interface) to servers 23 via the network 1, provides downstream control and data delivery via the downstream signal combiner 24 and upstream control and data reception via the upstream signal splitter 25. The signal combiner 24 couples the downstream signal of the CMTS 4 with the other signals (e.g. TV, Test, Telephony etc.). The output of the signal combiner 24 is connected to a fiber transceiver node 26, which converts the combined downstream signal suite from RF signals to optical signals, and delivers the combined optical signal suite to a remote location via the fiber optic link 3. The downstream optical signals are converted to RF signals at the transceiver node 27, which is also optically coupled to the optical fiber link 3. The RF signals from the transceiver node 27 are delivered to different subscriber premises 28a, 28b, 28c via the distribution node 8.

The distribution node 8 is part of the CATV plant 21. The CATV plant 21 also includes coaxial cable 7 connected to the plurality of subscriber premises 28a, 28b, 28c. As is known in the art, each of the subscriber premises 28a, 28b, 28c may be a residence, a commercial establishment, or an industrial establishment. Each subscriber premises 28a, 28b and 28c includes customer premises equipment (CPE) 6, which is any type of electronic equipment located on the customers premises and connected to the network. Typical examples of CPE 6 include terminal equipment devices such as cable modems (CMs), telephones, routers, switches, residential gateways, set-top boxes, fixed mobile convergence products, etc. For example, in one embodiment the CPE 6 at one subscriber's premises includes a VoIP analog terminal adaptor for telephone, a CM for computer, and a set-top box for a television.

In general, the RF signal delivered to and from the different subscriber premises 28a, 28b, 28c is a broadband RF signal including a number of different channels, each channel having a unique carrier frequency. A portion of the broadband RF signal is reserved for downstream data packet communication, and another portion reserved for upstream data packet communication. The carrier signal of each frequency is modulated by information. For example, higher frequency downstream channels are often modulated with an audio-visual baseband signal, which may be a standard analog NTSC signal or a digital television signal, whereas lower frequency upstream channels may be modulated with a data signal corresponding to data to be uploaded. In general, the CMTS 4 transmits the downstream data packets to the CPE 6 using known modulation techniques such as 64-QAM or 256-QAM, and receives upstream data packets from the CPE 6 using known demodulation techniques such as QPSK, 16-QAM, or 64-QAM, wherein the data packet communication often is implemented under transfer control protocol/Internet protocol (TCP/IP) standards. Accordingly, the CPE 6 often includes a QAM demodulator.

The CPE 6 listen to all frames transmitted on the downstream channel on which they are registered and accept the frames having a destination that match and/or are supported. At least one downstream channel is typically allocated to transmit time slot information from the CMTS to individual CPE devices, such as a CM. This time slot information includes times allocated by the CMTS 4 that the CPE 6 can use to transmit upstream RF communications. In particular, the mechanism provided by the DOCSIS Specification for establishing an upstream channel is a Media Access Control (MAC) Management Message, termed an Upstream Channel Descriptor (UCD), which is broadcast by the CMTS 4 to all CM on the network. In order to allow more than one CM to use the same channel or carrier, the upstream channels are separated typically using multiplexing techniques (e.g., Advanced Time Division Multiple Access (ATDMA) or Frequency Division Multiple Access (FDMA). The DOCSIS upstream channels use a burst modulation format, which supports multiple symbol rates and formats (QPSK, xQAM). The modulation format includes pulse shaping for spectral efficiency, is carrier-frequency agile, and has selectable output power level. Each burst is variable in length and supports a flexible modulation, symbol rate, preamble, randomization of payload, and programmable forward error correction (FEC) encoding. All of the upstream transmission parameters associated with burst transmission outputs from the CM are configurable by the CMTS 4 via MAC messaging. Many of the parameters are programmable on a burst-by-burst basis. Data is transmitted via the RF channels by framing DOCSIS MAC frames into Motion Picture Experts Group—Transport Stream (MPEG-TS) packets.

In accordance with one embodiment of the instant invention, CPE 6 including a receiver is used to measure one or more parameters of the downstream communication path and to provide feedback used to locate an ingress source(s). The downstream parameters provide an indication of the quality of the optical signal in the downstream path, such as the downstream carrier stability. In general, the downstream parameters will include a signal quality measurement, such as modulation error ratio (MER), bit error rate (BER), ingress under the carrier (IUC), or digital quality index (DQI). For example, in one embodiment the CPE 6 includes a CM having a QAM demodulator that provides the downstream parameters by directly monitoring signal level (i.e., power). In another embodiment, the CPE 6 includes a CM having a QAM demodulator that monitors and/or measures signal quality using one of the mechanisms to suppress impairments. In general, the downstream signal quality measurement, which is used to provide the feedback to locate the ingress source, will include one or more measured values or will include an indication that at least one of a signal level, a noise level, and a signal-to-noise ratio is outside of a predetermined range for a predetermined time.

Advantageously, the downstream signal quality measurement can be obtained for a single CATV downstream carrier (e.g., a single downstream channel). Accordingly, the monitored channel can be selected to be closer to the lower end of the downstream frequency range, which allows the monitoring of channels more likely to be affected by ingress. In one embodiment, the frequency range of the monitored channel will be between 54 and 150 MHz. In another embodiment, the frequency range of the monitored channel will be between selected to at the same frequency or a multiple frequency of known ingress sources. For example, since CB radios typically use frequencies about 27 MHz, in one embodiment the frequency range of the monitored channel is either 54 MHz and 81 MHz. In general, the monitored downstream channels will be lower in frequency than the DOCSIS downstream channels, which typically start around 400 MHz, and are typically less impacted by ingress.

In accordance with one embodiment of the instant invention, the test system 20 receives feedback corresponding to the downstream signal quality measurement, from CPE 6. In general, the test system 20, which includes an upstream monitoring system for monitoring the upstream of the HFC plant, is either a dedicated monitoring system or a network element capable of monitoring the system. In the embodiment illustrated in FIG. 3, the test system 20 is located at the headend 2, connected to the CMTS 4. In other embodiments, the test system 20 is located elsewhere in the network (e.g., connected elsewhere in the headend, such as to the upstream signal splitter 25, or is disposed at a remote monitoring location). In each case, the test system 20 is a monitoring/analysis system for analyzing upstream performance. In general, the test system 20 will be able to demodulate upstream data packets, to determine the origin of the data packets using an identifier in a source of the data packet (e.g., a MAC address), to measure QAM quality parameters such as MER, and/or to measure other upstream quality parameters such as spectral response, ingress noise, RF signal strength, etc. In general, the test system 20 will include a processor for calculating and/or analyzing upstream signal quality parameters of the demodulated data packets and for optionally sending further polling instructions. Optionally, the processor uses algorithms stored in non-volatile memory having a time element (e.g., in one embodiment the time element algorithm ensures that the test system 20 only looks at upstream noise detected above a predetermined threshold for a predetermined period of time). For example, in one embodiment the test system is a test system that provides upstream signal demodulation, analysis, and MAC address filtering, such as the PathTrak Return Path Monitoring System offered by JDSU™. Notably, although many upstream monitoring systems, such as the PathTrak system offered by JDSU™, are able to analyze upstream performance down to individual subscriber or technician (DSAM) modems, until now they have been generally considered inefficient in terms of determining the location of ingress into the network. For example, to test a particular node or a CM, a technician can specify the MAC address of a CM under test. Provided enough time is given to the PathTrak system, an upstream signal burst from the CM under test can be captured by the PathTrak system and subsequently analyzed for faults. However, in addition to the high network demands and time consumption, the process of scanning millions of CM for noise events in the upstream path is inefficient in that it provides little chance that the test instrument will be looking at the appropriate node/CM at exactly the right time ingress is occurring. In fact, while most operators have some type of monitoring systems that polls the elements in their network several times per day for status and other parameters (e.g., for transmitter and receiver signal level, receiver packet error counts), due to the massive number of elements in the system, operators are only able to achieve 2-4 polls per day, and it is done in a round robin fashion with no intelligence.

Figure 4:
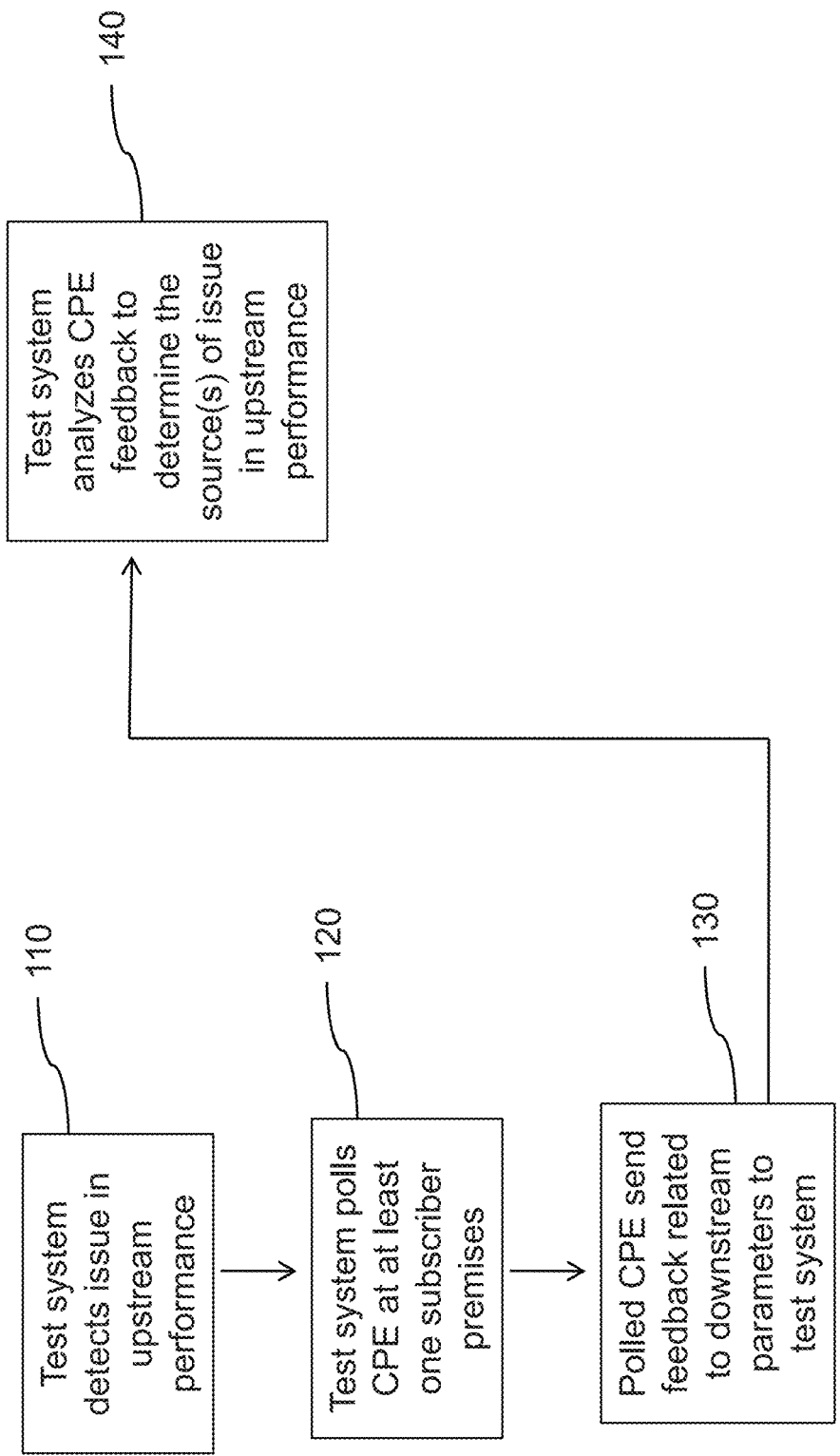
FIG. 4 is a schematic diagram of a method in accordance with one embodiment of the instant invention.

In accordance with one embodiment of the instant invention, the test system 20 uses intelligent polling of the CPE 6 to facilitate locating ingress into the system. Referring to FIG. 4, a flow chart of a method in accordance with one embodiment of the instant invention is shown. At 110, the test system 20, which is monitoring the HFC plant, detects that there is an issue with the upstream performance of the plant. For example, in one embodiment the issue is increased noise detected on the upstream (e.g., a noise threshold is reached on the test system 20, noise is detected in the upstream spectrum by the test system 20 or another network element, or a decreased S/N ratio on the upstream is reported by the test system 20 or another network element). In yet another embodiment, the issue with upstream performance is that a previous poll of CPE 6 has indicated an issue in the downstream at a single house. At 120, the test system 20 sends an instruction signal to the CPE 6 to obtain downstream parameters. For example, in one embodiment, wherein the test system detects that there is increased noise associated with a particular node, polling is triggered of all CPE 6 on that node to search for a specific offender. In another embodiment, where a particular CPE has indicated an issue with the downstream at a single subscriber premises, polling is triggered to see if the system is more widespread. At 130 the CPE 6 obtains the downstream parameters and sends feedback to the test device 20. In general, the feedback is transmitted on a convenient portion of the upstream channel. For example, in one embodiment the feedback includes the noise level and is transmitted as an IP packet using standard protocol. At 140, the feedback received at the test device 20 is analyzed to determine where common impairments are located, in order to determine the common element related to the issue with the upstream performance, and thus facilitate identifying the source of ingress into the system. In general, the feedback will be analyzed using software. For example, the software, which is stored on non-volatile memory, will typically identify the source of ingress using the MAC addresses of the CPE 6, which are cross-referenced to a customer database. Optionally, the results of the analysis is made available for remote clients through a web browser interface.

Advantageously, this intelligent approach to polling ensures that the noise localization polling and algorithms are used only when there is noise present in the system. In other words, the test system 20 provides the timing events that results in noise polling occurring at exactly the right time, thus improving both efficiency and effectiveness of the system. In addition, this real-time, intelligent approach to polling ensures that the ingress is caught and greatly reduces the network load of the locating system.

Further advantageously, using the feedback related to the downstream parameters measured by CPE 6 allows a technician to detect the exact home(s) that are contributing to the ingress, thus allowing them to drive direct to the source of the ingress, resulting in hours of time savings in each instance. In addition, using the downstream feedback from one CPE device to trigger the transmission of polling signals to other CPE in close proximity further aids the technician in localizing noise within neighboring homes, thus providing a direct route for the technician to fix the root cause of noise issues having multiple sources.

As discussed above, the CPE 6 typically includes a receiver that measures and/or monitors downstream signal quality (e.g., using signal level and/or one of the mechanisms traditionally used to suppress noise impairments).

In accordance with one embodiment of the instant invention, these signal quality measurements (e.g., signal level, level of AGC, level of equalization) are used to monitor the stability of the downstream signal and to provide feedback to the test system 20 indicating the presences of significant downstream noise. For example, the stability, which represents how the levels fluctuate over short periods of time (seconds), is typically evaluated using a predetermined threshold. More specifically, a threshold is selected that represents too much fluctuation of the signal. For example, some commercially available CPE are provided with an AGC stress warning system that detects when the AGC adjusts the gain by more than 0.5 dB within a single second. In accordance with an embodiment of the instant invention, if the AGC stress warning is activated, thus indicating significant noise in the downstream communication path, the CPE 6 would then provide the appropriate downstream feedback to the test system 20. In general, each of these measurements (e.g., signal level, level of AGC, level of equalization) would have different absolute thresholds, as well as possible relative thresholds. For example, even if the AGC cannot completely compensate for the noise, significant changes in the level of AGC may indicate that there is a signal stability issue caused by noise.

In general, the test system 20 will poll the downstream parameters through one of various methods known in the art. For example, in one embodiment the test system 20 communicates with the CPE test equipment via Simple Network Management Protocol (SNMP) using defined Management Information Bases (MIBs). In another embodiment, the test system 20 includes an embedded test client and headend server, thus providing a more efficient mechanism for communicating with the CPE. In one embodiment, as each CPE device comes online, the headend server provides identifying parameters by which the CPE device could signal it whenever a downstream impairment is detected. Such identifying parameters would typically include the server's IP address and communications port. Any CPE device detecting impairments of sufficient severity to warrant reporting would then signal the headend server. In one embodiment, the CPE sends the feedback data in a mutually-understood format using TCP to provide reliable delivery.

Advantageously, the method and systems disclosed herein can be provided via software changes to commercially available CPE and test systems. In addition, since upgraded CPE is typically provided to new subscribers, the system and methods disclosed herein provide a relatively simple, inexpensive and widely deployable solution for ingress noise localization. Furthermore, since the method and systems monitor ingress noise via downstream parameters, which are constantly available, it does not require a separate test signal to initiate testing. For example, in U.S. Pat. Appl. No. 20130003565, Gotwals teaches using CPE and upstream pre-equalization coefficients for testing an upstream path of a cable network. However, since the upstream parameters only are monitored, the system requires a testing prompt and an additional testing unit. In addition, the upstream packet processing and analysis can be time consuming and/or may require pre-filtering. In US Pat. Appl. No. 20120213259, which is herein incorporated by reference, Renken et al. teach using one or more measurement-capable modems (MCCMs) to perform a variety of downstream signal measurements that previously required a dedicated measurement instrument. However, the downstream stream parameters are not used to locate ingress and/or for intelligent polling.

In the above-described embodiments, the CPE 6 are used for obtaining downstream parameters. Since commercially available CPE typically include filters that limit their visibility to the downstream frequencies, these downstream parameters will typically correspond to signal, noise, and/or S/N measurements for one of the downstream frequencies. However, in some embodiments of the instant invention, the downstream parameters will include signal, noise, and/or S/N measurements of one or more of the upstream frequencies measured in the downstream direction. In these embodiments, the CPE 6 will include filter modifications to allow the CPE 6 equipment to analyze an upstream frequency band directly.

Of course, the above embodiments and applications have been provided as examples only. It will be appreciated by those of ordinary skill in the art that various modifications, alternate configurations, and/or equivalents will be employed without departing from the spirit and scope of the invention. Accordingly, the scope of the invention is therefore intended to be limited solely by the scope of the appended claims.

What is claimed is:

1. A method of locating ingress in a cable network comprising:

measuring signal quality in an upstream path of the cable network using a test system;

analyzing upstream signal quality measurements using the test system to determine whether noise in the upstream path is above a predetermined limit;

in response to a determination by the test system that the noise in the upstream path is above the predetermined limit, transmitting, using the test system, an instruction signal to a plurality of terminal equipment devices to request each terminal equipment device of the plurality of terminal equipment devices to transmit a downstream signal quality measurement to the test system, wherein each terminal equipment device that received the instruction signal is to determine the downstream signal quality measurement of the terminal equipment device to identify whether at least one of a signal level, a noise level, and a signal-to-noise ratio is outside of a predetermined range for a predetermined time of a downstream signal and to send a feedback indicative of the determined downstream signal quality measurement to the test system;

receiving, by the test system, the feedback indicative of the determined downstream signal quality measurement from at least one of the plurality of terminal equipment devices, wherein the at least one of the plurality of terminal equipment devices is to provide the feedback indicative of the determined downstream signal quality measurement to the test system in response to a determination by the at least one of the plurality of terminal equipment devices that at least one of the signal level, the noise level, and the signal-to-noise ratio of the downstream signal is outside of the predetermined range for the predetermined time for the terminal equipment device; and analyzing, by the test system, the received feedback to locate an ingress source contributing to the noise.

2. The method of claim 1, wherein each of the received feedback identifies whether a signal level of a single downstream channel is outside of a predetermined range for a predetermined time of the signal downstream signal.

3. The method of claim 2, wherein the single downstream channel has a frequency less than about 150 MHz.

4. The method of claim 1, wherein each of the received feedback identifies a fluctuation of the signal level of a single downstream channel.

5. The method of claim 4, wherein the single downstream channel has a frequency less than about 150 MHz.

6. The method of claim 1, wherein the test system is disposed at a headend of the cable network.

7. The method of claim 1, wherein analyzing the received feedback comprises determining which terminal equipment device sent the feedback.

8. The method of claim 7, wherein determining which terminal equipment device sent the feedback comprises using a MAC address of the plurality of terminal equipment devices to determine the terminal equipment device that sent the feedback.

9. A test system for locating ingress in a cable network comprising:
a processor, and
a memory on which is stored instructions that are to cause the processor to:
analyze upstream signal quality measurements in an upstream path;
determine, based on the analysis, whether noise in the upstream path is above a predetermined limit;
transmit, in response to a determination that the noise in the upstream path is above the predetermined limit, an instruction signal to a plurality of terminal equipment devices coupled to the test system via the cable network to request each terminal equipment device of the plurality of terminal equipment devices to transmit a downstream signal quality measurement to the test system, wherein each terminal equipment that received the instruction signal is to determine the downstream signal quality measurement of the terminal equipment device, the downstream signal quality measurement of the terminal equipment device identifying whether at least one of a signal level, a noise level, and a signal-to-noise ratio of a downstream signal is outside of a predetermined range for a predetermined time and to send a feedback indicative of the determined signal quality measurement to the test system;

receive the feedback indicative of the determined downstream signal quality measurement of the terminal equipment device from at least one of the plurality of terminal equipment devices, wherein the terminal equipment device is to provide the feedback indicative of the determined downstream signal quality measurement to the test system in response to a determination by the terminal equipment device that at least one of the signal level, the noise level, and the signal-to-noise ratio of the downstream signal is outside of the predetermined range for the predetermined time for the terminal equipment device; and analyze the received feedback to locate an ingress source contributing to the noise in the upstream path.

10. The test system of claim 9, wherein each of the received feedback identifies whether a signal level of a single downstream channel is outside of a predetermined range for a predetermined time of the signal downstream signal.

11. The test system of claim 10, wherein the single downstream channel has a frequency less than about 150 MHz.

12. The test system of claim 9, wherein each of the received feedback identifies a fluctuation of the signal level of a single downstream channel.

13. The test system of claim 12, wherein the single downstream channel has a frequency less than about 150 MHz.

14. The test system of claim 9, wherein the test system is disposed at a headend of the cable network.

15. The test system of claim 9, wherein the instructions are further to cause the processor to analyze the received feedback to determine which terminal equipment device sent the feedback.

16. The test system of claim 15, wherein the instructions are further to cause the processor to look up MAC addresses of the plurality of terminal equipment devices to determine which terminal equipment device sent the feedback.

17. The method of claim 1, wherein measuring signal quality in the upstream path of the cable network using the test system is performed in response to at least one of a signal level, a noise level, and a signal-to-noise ratio of a downstream channel being outside of a predetermined range for a predetermined time, the at least one of the signal level, the noise level, and the signal-to-noise ratio measured using a terminal equipment device.

18. A method of locating ingress noise in a cable network comprising:
monitoring a signal level of a first channel in a downstream path of the cable network with a first terminal equipment device having a first receiver,
in response to the monitored signal level being outside of a predetermined downstream signal level range for a predetermined downstream signal level time, determining, by the first terminal equipment device, whether at least one of a signal level, a noise level, and a signalto-noise ratio of the first channel in the downstream path is outside of a predetermined range for a predetermined time;

in response to a determination by the first terminal equipment device that at least one of the signal level, the noise level, and the signal-to-noise ratio of the first channel in the downstream path is outside of the predetermined range for the predetermined time, transmitting a feedback from the first terminal equipment device to a test system in communication with the first terminal equipment device via the cable network, wherein the feedback includes an indication that at least one of the signal level, the noise level, and the signal-to-noise ratio of the first channel in the downstream path is outside of the predetermined range for the predetermined time; and wherein the test system is to analyze the feedback to locate the ingress noise in the cable network.

19. The method of claim 1, wherein the predetermined range and the predetermined time correspond to a stability issue caused by downstream noise.

20. The method of claim 1, wherein the at least one of the plurality of terminal equipment devices is to automatically adjust a gain of the downstream signal, determine whether the gain of the downstream signal has been adjusted beyond the predetermined range for the predetermined time for the at least one of the terminal equipment devices, and based on a determination that the gain of the downstream signal has been adjusted beyond the predetermined range for the predetermined time, provide the feedback to the test system.

* * * * *